United States Patent [19]

Jahn et al.

[11] 4,166,642
[45] Sep. 4, 1979

[54] INSTALLATION ACCOMMODATED IN A HOLLOW VEHICLE BEARER FOR THE HEIGHT ADJUSTMENT OF AN UPPER DEFLECTION FITTING FOR THE SHOULDER BELT OF A BELT SYSTEM

[75] Inventors: Walter Jahn, Sindelfingen; Jürgen Gimbel, Gechingen, both of Fed. Rep. of Germany

[73] Assignee: Daimler-Benz Aktiengesellschaft, Fed. Rep. of Germany

[21] Appl. No.: 847,496

[22] Filed: Nov. 1, 1977

[30] Foreign Application Priority Data

Nov. 9, 1976 [DE] Fed. Rep. of Germany ....... 2651037

[51] Int. Cl.² .......................................... A62B 35/00
[52] U.S. Cl. ..................................................... 280/806
[58] Field of Search ....................... 280/744, 745, 747; 297/388, 389, 385

[56] References Cited

U.S. PATENT DOCUMENTS

| 3,178,222 | 4/1965 | Anderson et al. | 297/385 |
| 3,419,308 | 12/1968 | Apri | 297/389 X |
| 3,638,999 | 2/1972 | Toschler | 297/389 X |
| 3,746,393 | 7/1973 | Andres et al. | 297/385 |
| 3,923,321 | 12/1975 | Bauer et al. | 280/747 |
| 4,039,224 | 8/1977 | Bauer et al. | 297/389 |
| 4,042,276 | 8/1977 | Breitschwerdt | 297/388 X |

FOREIGN PATENT DOCUMENTS

| 2506269 | 8/1975 | Fed. Rep. of Germany | 280/747 |
| 2613654 | 10/1977 | Fed. Rep. of Germany | 280/747 |

*Primary Examiner*—Robert R. Song
*Assistant Examiner*—Norman L. Stack, Jr.
*Attorney, Agent, or Firm*—Craig and Antonelli

[57] ABSTRACT

An installation for the height adjustment of an upper deflection fitting for the shoulder belt of a belt system, which is accommodated in a hollow bearer of a vehicle, whereby the installation is steplessly displaceably guided in guidances of the hollow bearer while a hollow bearer wall is provided with at least one row of teeth or recesses into which engage the coordinated teeth or recesses of a detent member connected with the deflection fitting, against the effect of at least one spring force retaining the detent member in the normal position.

21 Claims, 4 Drawing Figures

INSTALLATION ACCOMMODATED IN A HOLLOW VEHICLE BEARER FOR THE HEIGHT ADJUSTMENT OF AN UPPER DEFLECTION FITTING FOR THE SHOULDER BELT OF A BELT SYSTEM

The present invention relates to an installation accommodated in a hollow vehicle bearer for the height adjustment of an upper deflection fitting for the shoulder belt of a belt system.

One seeks to achieve with installations of this type that the position of the deflection fitting for the safety belts not only takes place according to the average values suited for the majority of belt users but also according to such values which effect an adaptation of the upper anchoring point for the safety belts to extreme body sizes.

The present invention is concerned with the task to provide an installation which helps to eliminate in a relatively simple and inexpensive manner during belt use the disadvantages and discomforts caused with extreme body sizes of belt users by non-matched points of pivotal connection of the belt and which furthermore is capable of keeping the deflection fitting unchanged in its position not only during the normal driving operation but also in case of strong braking or during a vehicle impact.

The solution of the underlying problems takes place according to the present invention in that the mechanism is steplessly displaceably guided in guidances of the hollow vehicle bearer and in that a hollow bearer wall is provided with at least one row of teeth or with apertures into which the coordinated teeth of a detent member of the mechanism connected with the deflection fitting engage during those occurring belt tensional forces which go beyond the tensional forces acting during normal driving operation on the belt by the belt user, against the action of at least one spring force holding the detent member in the initial, normal position.

In one preferred embodiment of the present invention, the row of teeth (or rows of teeth) or the apertures may be arranged in the hollow bearer wall facing the interior space of the vehicle.

A height adjustment of the anchoring point of the safety belt is possible by means of an installation as disclosed in the Aug. 21, 1978 German Offenlegungsschrift No. 2,506,269. However, in this prior art construction, the anchoring point can be adjusted only in a step-wise manner, whereby after each height adjustment the safety belt anchoring means has to be brought into the locking position.

It is further proposed according to an advantageous construction of the present invention that the detent member cooperates with a slide member abutting at the guidances of the hollow vehicle bearer in such a manner that the detent member which is guided within a recess of the slide member transversely or approximately transversely to the movement direction thereof is adapted to be pulled out against the action of at least one return spring.

It is additionally provided as a further feature of the present invention that the detent member is securely connected with a fastening means for the deflection fitting having a shank, preferably with a bolt, and the shank is guided displaceable in height within an elongated aperture provided in the hollow bearer wall.

According to the present invention, the detent member may be provided with at least one uninterrupted bore accommodating the return spring, whereby the return spring pressing the detent member into the recess of the slide member is secured at the slide member.

Furthermore, provision is made according to the present invention that a transmission installation connecting the slide member with the seat, for example, by means of a Bowden cable is arranged in the vehicle, which during the adjustment of the seat in the driving direction steplessly displaces the slide member against the effect of a spring.

Accordingly, it is an object of the present invention to provide an installation for the height adjustment of an upper deflection fitting for the shoulder belt of a belt system, accommodated in a vehicle hollow bearer, which avoids by simple means the aforementioned shortcomings and drawbacks encountered in the prior art.

Another object of the present invention resides in an installation accommodated in a hollow bearer of a vehicle for adjusting the height of an upper deflection fitting for the shoulder belt of a belt system which assures a point of pivotal connection of the belt matched to the body size of the belt user, even in case of extreme body sizes.

A further object of the present invention resides in an installation for the height adjustment of an upper deflection fitting for the shoulder belt of a belt system of the type described above which retains the deflection fitting securely in its position not only during normal driving operation but also in case of strong decelerations caused, for example, by braking or by a front end collision.

Still another object of the present invention resides in an installation accommodated in a hollow vehicle bearer for adjusting the height of an upper deflection fitting for the shoulder belt of a belt system which permits a stepless adjustment thereof.

Another object of the present invention resides in an installation of the type described above for the height adjustment of an upper deflection fitting for the shoulder belt of a belt system which provides a stepless automatic adjustment of the upper point of pivotal connection in dependence on the adjustment of the seat in the longitudinal direction of the vehicle.

These and other objects, features and advantages of the present invention will become more apparent from the following description when taken in connection with the accompanying drawing which shows, for purposes of illustration only, one embodiment in accordance with the present invention, and wherein.

Figure 1:
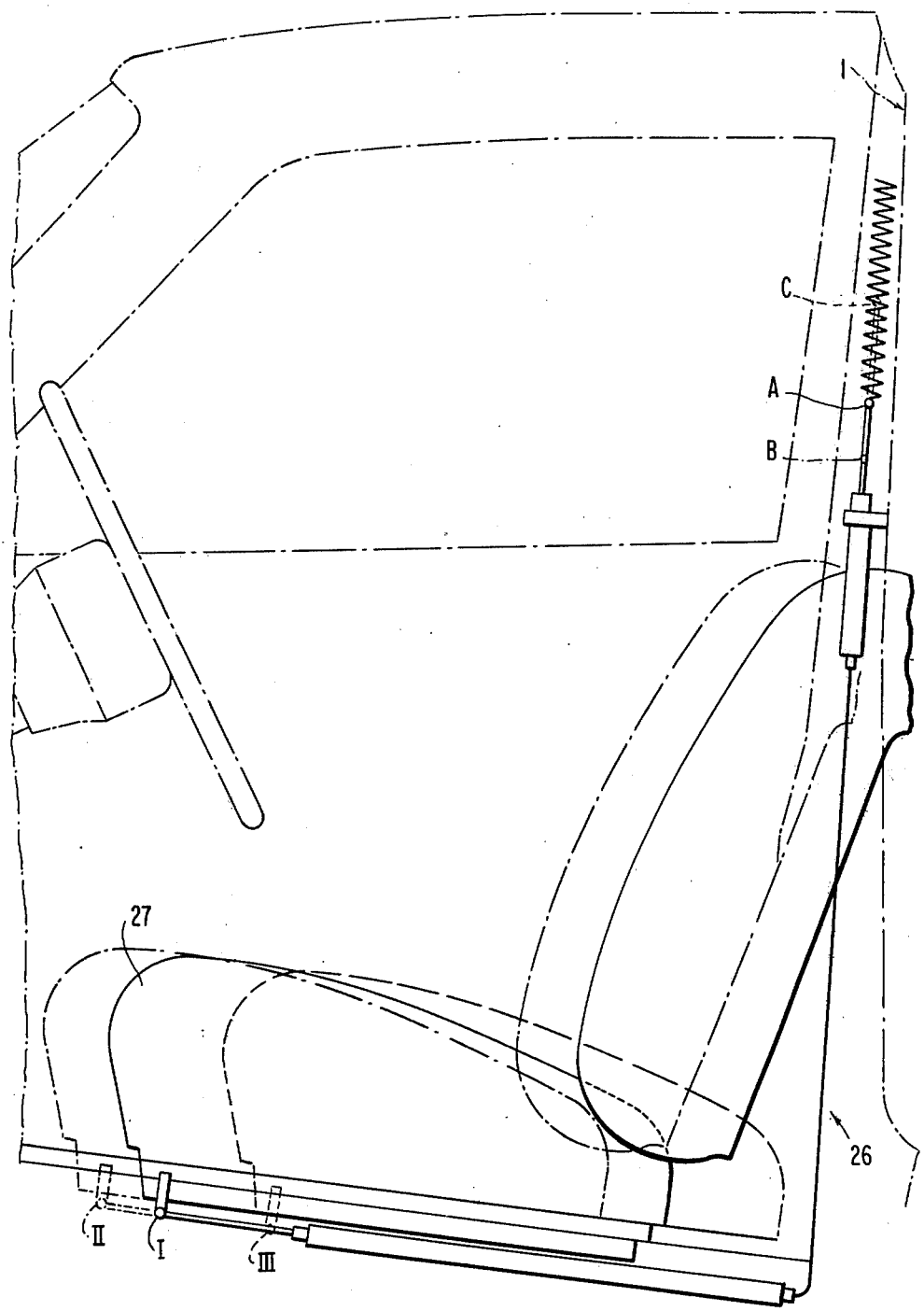
FIG. 1 is a schematic side elevational view illustrating an overall arrangement of the installation according to the present invention for the height adjustment of an upper deflection fitting for a shoulder belt in a motor vehicle.

Referring now to the drawing wherein like reference numerals are used throughout the various views to designate like parts, a deflection fitting 2 (FIG. 2) for a safety belt, which is arranged adjustable in height within the area of a center column 1 of a passenger motor vehicle (FIG. 1), is securely connected by way of a fastening element generally designated by reference numeral 3 (FIG. 2) with a mechanism generally designated by reference numeral 5 guided within a hollow bearer generally designated by reference numeral 4.

The mechanism 5 consists of a parallelepiped slide member 6 with a large-volume recess 7, in which a detent member 8 matched to the recess 7 is displaceably guided transversely to the movement direction of the slide member 6 against the pressure of one or several return springs 9.

Figure 2:
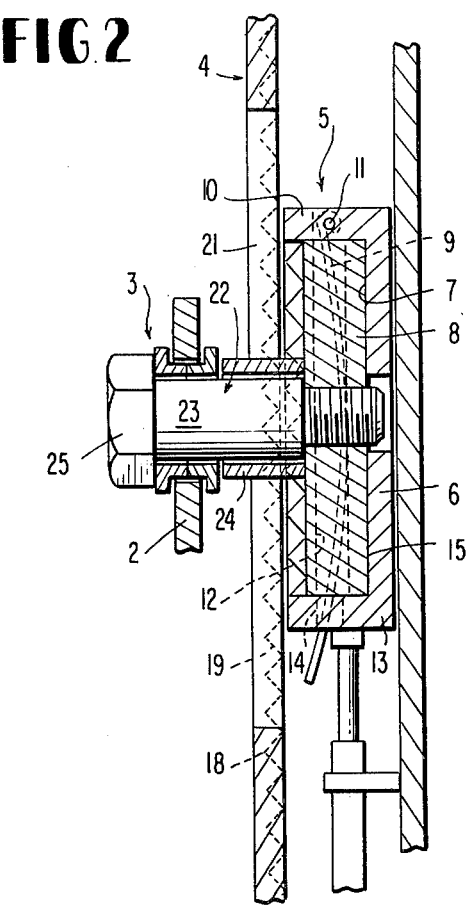
FIG. 2 is a cross-sectional view, on an enlarged scale, illustrating a slide member of the height adjustment mechanism in accordance with the present invention which is guided in a hollow bearer and includes a detent member.

The return spring 9 constructed as leaf spring is secured in the upper part 10 of the slide member 6, for example, by means of a pin 11, which is extended through the bent-off end of the leaf spring 9, whereby the spring 9 passes through a bore 12 provided in the detent member 8 as well as through a bore 14 arranged in the lower portion 13 of the slide member 6 and projects with its free end out of the slide member 6 (FIG. 2).

The leaf spring or springs 9 press the detent member 8 against the wall 15 of the recess 7 and retain the same thereat in the normal position (FIG. 2).

Figure 4:
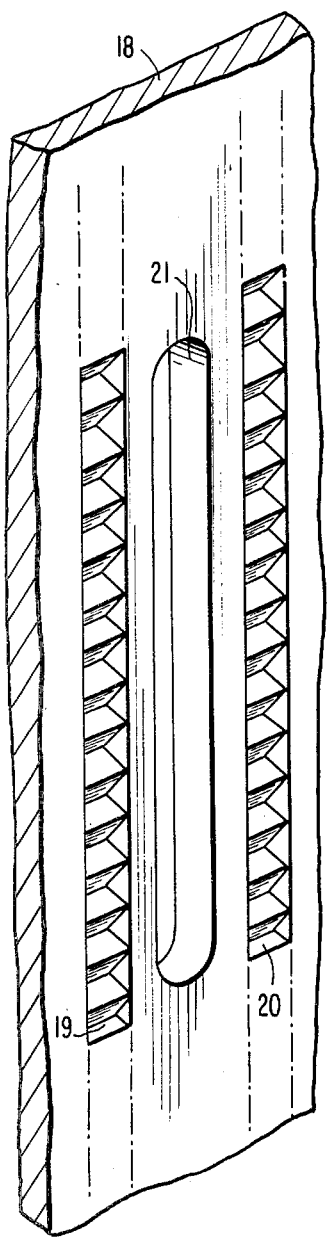
FIG. 4 is a partial perspective view of a hollow bearer wall located on the inner side of the vehicle and provided with an elongated aperture and two rows of teeth in accordance with the present invention.
Figure 3:
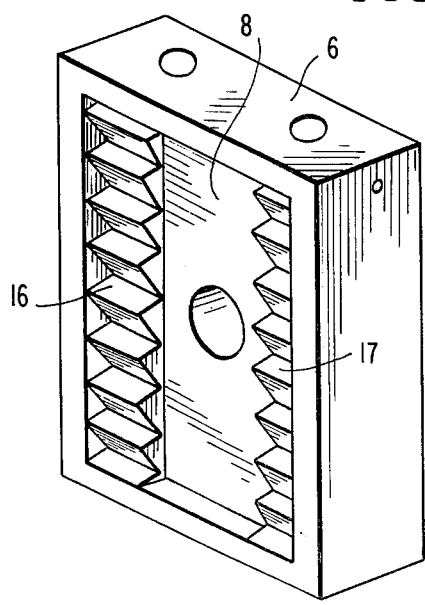
FIG. 3 is a perspective view, on an enlarged scale, of the detent member fitted into a recess of the slide member of the height adjusting mechanism in accordance with the present invention.

The detent member 8 is provided with two parallel rows of teeth 16 and 17 (FIG. 3) disposed adjacent one another which are coordinated to similarly shaped rows of teeth 19 and 20 (FIG. 4) provided in the hollow bearer wall 18 facing the interior space of the vehicle and which are disposed mutually opposite one another without contacting one another, as can be seen from FIG. 2.

An elongated aperture 21 is provided between the two rows of teeth 19 and 20 of the hollow bearer wall 18, through which is extended a bolt 22 threadably secured with the detent member 8, which slides up or down in the elongated aperture 21 during a height adjustment of the installation 5 by means of a sleeve 24 surrounding the bolt shank 23. The deflection fitting 2 is pivotally arranged between the sleeve 24 and the bolt head 25.

The slide member 6 is connected with the seat 27 (FIG. 1) by way of a transmission installation generally designated by reference numeral 26. The illustrated transmission installation 26 essentially consists of a Bowden cable which—in case of an adjustment of the seat 27 from the base position I into the position II—takes along the slide member 6 in the hollow bearer 4 downwardly into the position B or which forces the slide member 6 into the position C as soon as the seat is displaced into the position III. The height adjustment of the mechanism 5 takes place steplessly. Consequently, the upper belt anchoring means can be adjusted automatically to every body size of the belt user.

During a readjustment of the seat, the slide member 6 is additionally pulled into the uppermost position by means of a drawspring. If the path of the slide member which is adapted to be traversed by the latter, should be smaller than the adjusting path of the seat, then a translation mechanism of any conventional construction is interconnected in the Bowden cable within the area of the seat.

In order that the adjusted position of the upper belt-anchoring means remains preserved unchanged during stressing of the belt by the belt user as a result of a strong braking action or as a result of a vehicle impact, the detent member 8 is pulled out of the slide member 6 against the return spring 9 and engages with its teeth into the teeth of the hollow bearer wall 18. If the belt is unstressed or released, then the return spring 9 forces the detent member 8 back into the initial position. The previously blocked slide member 6 is then again freely movable in the hollow bearer 4.

The height adjustment of the upper belt-anchoring means can also possibly be realized manually. For that purpose, the transmission installation would have to be replaced by a friction element, for example, by an elastic pressure plate which prevents a slipping of the mechanism 5 in the hollow bearer 4. The friction element could be arranged between the slide member and the guide means of the outwardly disposed hollow bearer wall 28.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A mechanism, accommodated in a hollow vehicle bearer, for adjusting the height of an upper deflection fitting for a shoulder belt of a belt system, comprising:
   guide means for infinitely variably displaceably adjusting the position of said mechanism within said hollow bearer;
   engagement means provided in a wall of said hollow bearer;
   detent means operatively connected with the deflecting fitting and being provided with complementary engagement means shaped for locking contact with said engagement means;
   spring means biasing said complementary engagement means into a disengaged position relative to said engagement means under normal use conditions and for enabling engagement between said complementary engagement means and said engagement means upon application of tensional belt forces in excess of normal user retention forces of the type occurring during strong vehicle braking action and during a vehicle impact, said excessive tensional forces acting on said detent means so as to pull said complementary engagement means into said locking contact.

2. A mechanism according to claim 1, comprising: means for automatically adjusting the position of said upper deflection fitting in dependence upon the adjustment of a vehicle seat in the longitudinal direction, said means for automatically adjusting including slide means within said hollow bearer wall and cooperating with said detent member and complementary engagement means, and transmission means operatively connected between said slide and said vehicle seat for steplessly displacing said slide means in conjunction with said longitudinal seat movement.

3. A mechanism according to claim 1, characterized in that the engagement means include at least one row of teeth.

4. A mechanism according to claim 3, characterized in that the complementary engagement means include at least one row of teeth.

5. A mechanism according to claim 1, characterized in that the engagement means include aperture means.

6. A mechanism according to claim 5, characterized in that the complementary engagement means include at least one row of teeth.

7. A mechanism according to claim 1, characterized in that the hollow bearer wall provided with said engagement means faces the interior space of the vehicle.

8. A mechanism according to claim 1, characterized in that the detent means cooperates with a slide means abutting at the guide means of the hollow bearer in such a manner that the detent means which is guided in a recess of the slide means at least approximately transversely to the movement direction of the latter, is adapted to be pulled out against the action of at least one return spring.

9. A mechanism according to claim 8, characterized in that the detent means is securely connected with a fastening means having a shank portion for the deflection fitting, and in that the shank portion is guided displaceable in height within an elongated aperture provided in the hollow bearer wall.

10. A mechanism, accommodated in a hollow vehicle bearer, for adjusting the height of an upper deflection fitting for the shoulder belt of a belt system, characterized in that the mechanism is steplessly displaceably guided in guide means of the hollow bearer, and in that one hollow bearer wall is provided with engageable means, a detent means operatively connected with the deflection fitting and provided with complementary engageable means, said complementary engageable means engaging in the engageable means against the action of a spring force retaining the detent means in its normal position during those occurring tensional belt forces which exceed the belt forces acting on the belt by the belt user during normal driving operation, in that the detent means cooperates with a slide means abutting at the guide means of the hollow bearer in such a manner that the detent means which is guided in a recess of the slide means at least approximately transversely to the movement direction of the latter, is adapted to be pulled out against the action of at least one return spring, in that the detent means is securely connected with a fastening means having a shank portion for the deflection fitting, in that the shank portion is guided to be displaceable in height within an elongated aperture provided in the hollow bearer wall, and in that the fastening means is a bolt.

11. A mechanism, accommodated in a hollow vehicle bearer, for adjusting the height of an upper deflection fitting for the shoulder belt of a belt system, characterized in that the mechanism is steplessly displaceably guided in guide means of the hollow bearer, in that one hollow bearer wall is provided with engageable means, a detent means operatively connected with the deflection fitting and provided with complementary engageable means, said complementary engageable means engaging in the engageable means against the action of a spring force retaining the detent means in its normal position during those occurring tensional belt forces which exceed the belt forces acting on the belt by the belt user during normal driving operation, in that the detent means cooperates with a slide means abutting at the guide means of the hollow bearer in such a manner that the detent means which is guided in a recess of the slide means at least approximately transversely to the latter, is adapted to be pulled out against the action of at least one return spring, in that the detent means is securely connected with a fastening means having a shank portion for the deflection fitting, in that the shank portion is guided to be displaceable in height within an elongated aperture provided in the hollow bearer wall, and in that the detent means is provided with a continuous bore accommodating the return spring, whereby the return spring forcing the detent means into the recess of the slide means is secured at the slide means.

12. A mechanism, accommodated in a hollow vehicle bearer, for adjusting the height of an upper deflection fitting for the shoulder belt of a belt system, characterized in that the mechanism is steplessly displaceably guided in guide means of the hollow bearer, in that one hollow bearer wall is provided with engageable means, a detent means operatively connected with the deflection fitting and provided with complementary engageable means, said complementary engageable means engaging in the engageable means against the action of a spring force retaining the detent means in its normal position during those occurring tensional belt forces which exceed the belt forces acting on the belt by the belt user during normal driving operation, in that the detent means cooperates with a slide means abutting at the guide means of the hollow bearer in such a manner that the detent means which is guided in a recess of the slide means at least approximately transversely to the movement direction of the latter, is adapted to be pulled out against the action of at least one return spring, in that the detent means is securely connected with a fastening means having a shank portion for the deflection fitting, in that the shank portion is guided to be displaceable in height within an elongated aperture provided in the hollow bearer wall, and in that a transmission means is provided operatively connecting the slide means with a seat of the vehicle, said transmission means being operable to steplessly displace the slide means against the force of a spring during the adjustment of the seat in the driving direction.

13. A mechanism according to claim 12, characterized in that the transmission means includes a bowden cable.

14. A mechanism according to claim 12, characterized in that the transmission means includes means for compensating between differences in the travel path of the seat in its adjustment in the longitudinal direction and the travel path of the slide means in the guide means provided in the hollow bearer.

15. A mechanism according to claim 12, characterized in that said engageable means are of substantially complementary form-locking configuration.

16. A mechanism according to claim 15, characterized in that the first-mentioned engageable means are arranged in a hollow bearer wall facing the interior space of the vehicle.

17. A mechanism according to claim 1, characterized in that the detent means is securely connected with a fastening means having a shank portion for the deflection fitting, and in that the shank portion is guided displaceable in height within an elongated aperture provided in the hollow bearer wall.

18. A mechanism, accommodated in a hollow vehicle bearer, for adjusting the height of an upper deflection fitting for the shoulder belt of a belt system, characterized in that the mechanism is steplessly displaceably guided in guide means of the hollow bearer, in that one hollow bearer wall is provided with engageable means, a detent means operatively connected with the deflection fitting and provided with complementary engageable means, said complementary engageable means engaging in the engageable means against the action of a spring force retaining the detent means in its normal position during those occurring tensional belt forces which exceed the belt forces acting on the belt by the belt user during normal driving operation, in that the detent means cooperates with a slide means abutting at the guide means of the hollow bearer in such a manner that the detent means which is guided in a recess of the slide means at least approximately transversely to the movement direction of the latter, is adapted to be pulled out against the action of at least one return spring, and in that the detent means is provided with a continuous bore accommodating the return spring, whereby the return spring forcing the detent means into the recess of the slide means is secured at the slide means.

19. A mechanism, accommodated in a hollow vehicle bearer, for adjusting the height of an upper deflection fitting for the shoulder belt of a belt system, characterized in that the mechanism is steplessly displaceably guided in guide means of the hollow bearer, in that one hollow bearer wall is provided with engageable means, a detent means operatively connected with the deflection fitting and provided with complementary engageable means, said complementary engageable means engaging in the engageable means against the action of a spring force retaining the detent means in its normal position during those occurring tensional belt forces which exceed the belt forces acting on the belt user during normal driving operation, in that the detent means cooperates with a slide means abutting at the guide means of the hollow bearer in such a manner that the detent means which is guided in a recess of the slide means at least approximately transversely to the movement direction of the latter, is adapted to be pulled out against the action of at least one return spring, and in that a transmission means is provided operatively connecting the slide means with a seat of the vehicle, said transmission means being operable to steplessly displace the slide means against the force of a spring during the adjustment of the seat in the driving direction.

20. A mechanism according to claim 19, characterized in that the transmission means includes a bowden cable.

21. A mechanism according to claim 20, characterized in that the transmission means includes means for compensating between differences in the travel path of the seat in its adjustment in the longitudinal direction and the travel path of the slide means in the guide means provided in the hollow bearer.

* * * * *